June 12, 1934.  L. C. HUCK  1,962,658

BRAKE MECHANISM

Filed June 30, 1930

Inventor
Louis C. Huck

By Blackmore, Spencer & Fluck
Attorneys

Patented June 12, 1934

1,962,658

UNITED STATES PATENT OFFICE 1,962,658

BRAKE MECHANISM

Louis C. Huck, New York, N. Y.

Application June 30, 1930, Serial No. 464,852

6 Claims. (Cl. 188—78)

This invention relates to brakes, more particularly to internal brakes as used on vehicles.

An object of the invention is to improve the mechanism for expanding the brake shoe into contact with the drum.

A further object is to reduce the sliding friction between the cam expanding means and the end of the shoe.

Other advantages will be understood from the following description.

Figure 1:
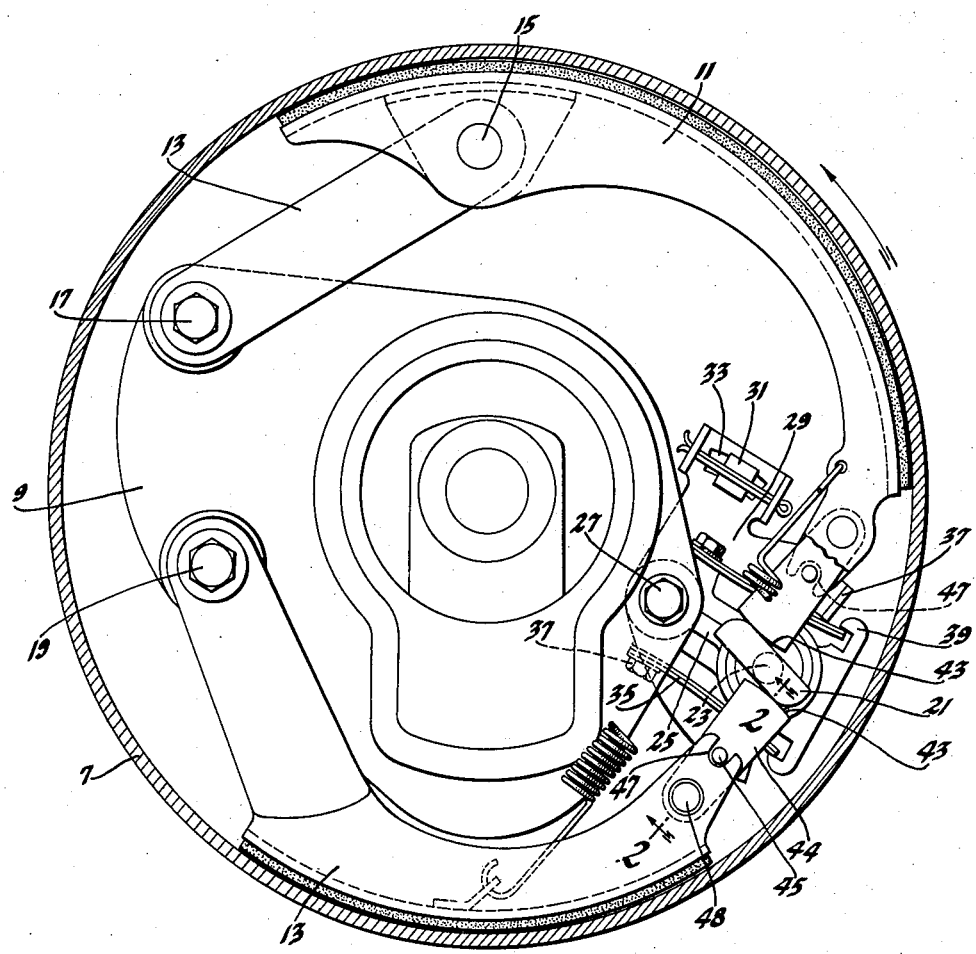

In the drawing accompanying this description Fig. 1 is a view of an internal brake showing the parts in elevation.

Figure 2:
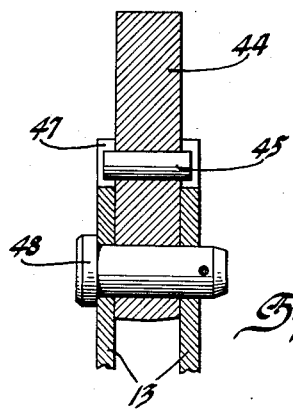

Fig. 2 is a section on line 2—2 of Fig. 1.

Referring by reference characters to the drawing, numeral 7 represents the flange of a brake drum, such a drum as is usually carried by the wheels of a vehicle. Adjacent the drum is a relatively fixed plate 9 serving as an anchorage for the shoes which are to be moved into frictional engagement with the drum flange. Numeral 11 represents the longer of the two shoes and 13 the shorter of the two shoes, the long shoe being intended to be self-actuating for forward vehicle travel as indicated by the arrow, and the short shoe being self-actuating for reverse travel.

Shoe 11 is anchored to the fixed plate 9 by links 13. These links are pivoted to the shoe at 15 and to the fixed plate at 17. Shoe 13 is directly pivoted to plate 17 by pivot means 19. The articulated link construction used with the long shoe is intended to facilitate conformity with the drum flange, to permit the use of a lining having a relatively high coefficient of friction, to avoid grabbing of the shoe, and to have other advantages.

With a brake of this type it is desirable to use a floating cam whereby the applied pressure is equalized between the two shoes. To that end the cam 21 has a shaft 23 journaled in a member 25 rotatably mounted about a pivot 27 relatively to plate 29, this plate being located by said pivot 27, there being adjustable fastening means 31 passing through a slot 33 in plate 29. Springs 35 secured at 37 to the member 25 near its pivot engage hooked ends 39 at the remote part of the member 25. These springs are also intermediately engaged by parts 37 of plate 29. When the member 25 swings one or the other of springs 35 is tensioned, this tension serving to restore the cam to its initial position in a manner well known.

The cam engages not the end of the shoes as is commonly the case, but it engages what I have chosen to call roller sectors 44. These sectors have arc-shaped surfaces 43 engaged by the cam, the arc being struck from the center pins 48 about which the roller sectors are pivoted to the shoes 11 and 13. By this means the sliding friction between the cam and the ends of the shoes is reduced to a very great extent.

Ordinarily the cam engages the end of the shoe and forces the shoe into frictional contact with the drum. In so doing there is a sliding movement between the end of the shoe and the cam which causes friction and therefore wastes, to some extent, the pressure applied to the pedal or operating lever. It has been proposed to use a roller on the end of the shoe, the roller to be engaged by the cam and operating to overcome the sliding friction, the roller turning about its own pivot pin. Such a roller cannot be of great radius owing to the limited space available, and since the saving in friction depends upon the ratio between the radius of the roller and the radius of the pin about which it turns, the advantage is not so great as could be desired. With the use of a roller sector it is possible to increase greatly the ratio of the radius of roller sector relative to the radius of the pivot about which it turns and thereby much more effectively reduce the losses due to sliding friction.

When the lining becomes worn these roller sectors might have such a degree of rotation as to cause the cam to leave the curved surface of the sector. To prevent such a condition means is provided to limit the swinging of the roller sector about its pivot. Such means may take any preferred form, but I have shown a pin 45 carried by the roller sector adjacent the ends of the shoes. The shoes are shown as provided with slots 47 to receive the pin 45, the slots being so dimensioned as to provide a limited movement of the roller as it swings about its pivot pin 45.

By this construction, owing to the relatively large ratio between the radius of the sector roller and its pivot pin, a much greater reduction in the sliding friction is accomplished than would be possible with the conventional roller pivoted to the end of the shoes.

I claim:

1. In a brake, a drum, a shoe, a roller sector pivoted to said shoe adjacent its end, a rotary brake-applying means to engage said roller sector with rolling contact and press said shoe into frictional contact with said drum, the radius of the arc of said roller sector, which engages the brake-applying means, being substantially greater than the radius of sliding engagement between the roller sector and the shoe at the pivotal connection therebetween, together with cooperating means on said sector and shoe to limit the rotary movement of said roller sector.

2. In a brake, a drum, a pair of shoes, a cam between adjacent ends of said shoes, anchoring means for the opposite ends of said shoes, roller sectors pivoted to said adjacent ends and engaged with rolling contact by said cam, said roller sectors having relatively large ratios between their radii and the radii of their pivots, the radii of said roller sectors being longer than radial lines from their pivots to the drum.

3. In a brake, a drum, a pair of shoes, a cam between adjacent ends of said shoes, anchoring means for the opposite ends of said shoes, roller sectors pivoted to said adjacent ends and engaged with rolling contact by said cam, said roller sectors having relatively large ratios between their radii and the radii of their pivots, together with cooperating means on said shoes and sectors to limit the rotation of said sectors relative to said shoes.

4. In a brake, a shoe, a roller sector, a pivot therefor adjacent one end of said shoe, said roller sector projecting beyond the end of said shoe, together with cooperating means at the extremity of said shoe to limit the rotation of said roller sector.

5. In a brake, a drum, a shoe, a fixed support, means to anchor one end of said shoe to said support, brake-applying means adjacent the other end of said shoe to move said shoe into frictional contact with said drum, a roller sector, a pivot therefor adjacent the said other end of said shoe, said roller sector having an arc-shaped surface engaging said brake-applying means, said arc-shaped surface having a radius substantially in excess of the radius of sliding contact between the shoe and the roller sector at the pivotal connection therebetween, said roller sector projecting beyond the end of said shoe, and cooperating parts on said roller sector and shoe adjacent the extreme end of the latter to limit the swinging of said roller sector about its pivot.

6. In a brake, a drum, a shoe, a roller sector, a pivot for said roller sector adjacent the end of the shoe whereby sliding friction at the pivot occurs as the roller sector rotates, a rotary brake-applying means having a rolling engagement with the periphery of the roller sector, the roller sector permitting the ratio of the radius of its arcuate periphery to be sufficiently greater than the radius of the pivot that the anti-frictional engagement of the brake-applying means with the roller sector may not be materially counteracted by the sliding engagement of the pivot and roller sector.

LOUIS C. HUCK.